(12) United States Patent
Rondao Alface et al.

(10) Patent No.: US 9,667,969 B2
(45) Date of Patent: May 30, 2017

(54) METHOD AND APPARATUS FOR ENCODING A VIDEO STREAM HAVING A TRANSPARENCY INFORMATION CHANNEL

(71) Applicant: Alcatel Lucent, Boulogne Billancourt (FR)

(72) Inventors: Patrice Rondao Alface, Nivelles (BE); Sigurd Van Broeck, Zoersel (BE); Christoph Stevens, Stekene (BE); Jean-Francois Macq, Ganshoren (BE)

(73) Assignee: Alcatel Lucent, Boulogne-Billancourt (FR)

( * ) Notice: Subject to any disclaimer, the term of this patent is extended or adjusted under 35 U.S.C. 154(b) by 174 days.

(21) Appl. No.: 14/404,814

(22) PCT Filed: May 23, 2013

(86) PCT No.: PCT/EP2013/060579
§ 371 (c)(1),
(2) Date: Dec. 1, 2014

(87) PCT Pub. No.: WO2013/178524
PCT Pub. Date: Dec. 5, 2013

(65) Prior Publication Data
US 2015/0117518 A1    Apr. 30, 2015

(30) Foreign Application Priority Data
Jun. 1, 2012   (EP) .................. 12305617

(51) Int. Cl.
*H04N 7/18*     (2006.01)
*H04N 19/12*    (2014.01)
(Continued)

(52) U.S. Cl.
CPC ............. *H04N 19/12* (2014.11); *G06T 9/001* (2013.01); *H04N 19/146* (2014.11);
(Continued)

(58) Field of Classification Search
CPC ....... H04N 19/00478; H04N 19/00533; H04N 19/00078
(Continued)

(56) References Cited

U.S. PATENT DOCUMENTS 6,081,554 A   6/2000 Lee et al.
7,574,056 B2  8/2009 Funakubo et al.
(Continued)

FOREIGN PATENT DOCUMENTS

CN    1968418 A     5/2007
CN    101889447 A   11/2010
(Continued)

OTHER PUBLICATIONS

Afifa Dahmane et al., "Towards a New Format for Image Coding," IEEE International Conference on Machine and Web Intelligence, pp. 307-311, XP031810405, 2010.
(Continued)

*Primary Examiner* — Andy Rao
(74) *Attorney, Agent, or Firm* — Fay Sharpe, LLP

(57) ABSTRACT

Method for encoding a video stream having a transparency information channel in view of a predetermined target bit rate for said transparency information channel, comprising: tentatively applying a first encoding (130) to said transparency information channel, said first encoding (130) comprising lossless vector graphics encoding; if said first encoding results in an encoded bitrate within said predetermined target bitrate (140), selecting said first encoding (150) to produce an encoded version of said transparency information channel; otherwise, tentatively applying a second encoding (160) to said transparency information channel, said second encoding (160) comprising a mathematical representation encoding scheme; if said second encoding results in an encoded bitrate within said predetermined
(Continued)

target bitrate (170), selecting said second encoding (180) to produce an encoded version of said transparency information channel; otherwise, selecting a third encoding (190) to produce an encoded version of said transparency information channel, said third encoding comprising MPEG-based encoding.

11 Claims, 2 Drawing Sheets

(51) Int. Cl.
| | | |
|---|---|---|
| *G06T 9/00* | (2006.01) | |
| *H04N 19/597* | (2014.01) | |
| *H04N 19/172* | (2014.01) | |
| *H04N 19/15* | (2014.01) | |
| *H04N 19/61* | (2014.01) | |
| *H04N 19/156* | (2014.01) | |
| *H04N 19/164* | (2014.01) | |
| *H04N 19/177* | (2014.01) | |
| *H04N 19/174* | (2014.01) | |
| *H04N 19/21* | (2014.01) | |
| *H04N 19/146* | (2014.01) | |

(52) U.S. Cl.
CPC ........... *H04N 19/15* (2014.11); *H04N 19/156* (2014.11); *H04N 19/164* (2014.11); *H04N 19/172* (2014.11); *H04N 19/174* (2014.11); *H04N 19/177* (2014.11); *H04N 19/21* (2014.11); *H04N 19/597* (2014.11); *H04N 19/61* (2014.11)

(58) Field of Classification Search
USPC ........................................ 375/240.01–240.29
See application file for complete search history.

(56) References Cited

U.S. PATENT DOCUMENTS

| | | | |
|---|---|---|---|
| 7,711,196 B2 | 5/2010 | Kim et al. | |
| 8,170,097 B2* | 5/2012 | Tabatabai | ............... H04N 19/70 375/240.01 |
| 8,229,235 B2 | 7/2012 | Kim et al. | |
| 8,271,552 B2 | 9/2012 | Kim et al. | |
| 2007/0098283 A1 | 5/2007 | Kim et al. | |

FOREIGN PATENT DOCUMENTS

| | | |
|---|---|---|
| EP | 0 753 970 A2 | 1/1997 |
| EP | 1 241 893 A2 | 9/2002 |
| EP | 1 388 815 | 2/2004 |
| JP | H-10191322 | 7/1998 |
| JP | 2002-527958 | 8/2002 |
| JP | 2003-348360 | 12/2003 |
| JP | 2005-191956 | 7/2005 |
| JP | 2006-140968 | 6/2006 |
| JP | 2009-512325 | 3/2009 |
| JP | 2011-193437 | 8/2011 |
| KR | 10-0695133 | 3/2007 |
| KR | 10-0723505 | 5/2007 |
| WO | WO 00/21295 A1 | 4/2000 |
| WO | WO 2006/052577 A2 | 5/2006 |
| WO | WO 2012/036901 A1 | 3/2012 |

OTHER PUBLICATIONS

"Core Experiments on MPEG-4 Video Shape Coding," International Organisation for Standardisation, ISO/IEC JTC1/SC29/WG11, Coding of Moving Pictures and Audio Information, pp. 192-204, Section 3.9, pp. 192-209, XP030010279, Nov. 11, 1996.

N. Brady et al., "Context-based Arithmetic Encoding of 2D Shape Sequences," International Conference on Image Processing, IEEE, pp. 29-32, XP002065471, 1997.

Thomas Sikora, "The MPEG-4 Video Standard Verification Model," IEEE Transactions on Circuits and Systems for Video Technology, vol. 7, No. 1, pp. 19-31, XP011014363, Feb. 1997.

Wei-ge Chen et al., "α-Channel Compression in Video Coding," IEEE, Imaging Processing, vol. 1, pp. 500-503, XP010254217, 1997.

Shinya Kadono et al., "An Image Coding Scheme Using Opacity Information," Information Processing Society of Japan, vol. 95, No. 64, pp. 1-8, XP002938047, Jul. 1995.

Gilles Privat et al., "Hardware support for shape decoding from 2D-region-based image representations," Proceedings of SPIE, vol. 3021, pp. 149-159, XP000648210, Feb. 1997.

International Search Report for PCT/EP2013/060579 dated Aug. 9, 2013.

* cited by examiner

METHOD AND APPARATUS FOR ENCODING A VIDEO STREAM HAVING A TRANSPARENCY INFORMATION CHANNEL

FIELD OF THE INVENTION

The present invention relates to the field of video coding, and in particular to the field of coding transparency information in video streams.

BACKGROUND

Presently, efforts are underway to standardize techniques to encode 3D scenes where depth and disparity and multiple viewpoints are among important aspects. There is a need for high-efficiency coding for the alpha (transparency, translucency or opacity) channel of the moving picture.

SUMMARY

According to an aspect of the invention, there is provided a method for encoding a video stream having a first transparency information channel in view of a predetermined target bit rate for the first transparency information channel, the method comprising: tentatively applying a first encoding to a portion of the first transparency information channel, the first encoding comprising a lossless vector graphics encoding scheme; if the first encoding results in an encoded bitrate within the predetermined target bitrate, selecting the first encoding to produce an encoded version of the portion of the first transparency information channel; otherwise, tentatively applying a second encoding to the portion of the first transparency information channel, the second encoding comprising a mathematical representation encoding scheme; if the second encoding results in an encoded bitrate within the predetermined target bitrate, selecting the second encoding to produce an encoded version of the portion of the first transparency information channel; otherwise, selecting a third encoding to produce an encoded version of the portion of the first transparency information channel, the third encoding comprising an MPEG-based encoding scheme.

It is an advantage of embodiments of the present invention that the nature of the transparency channel is taken into account to produce a more efficiently encoded stream. This may require using other encoding schemes than those normally used for the color information. Moreover, as different portions (slices, tiles, frames, or groups of frames) of the transparency information may require different types of encoding, an assessment may be conducted for each portion.

In an embodiment, the method according to the present invention further comprises using the selected encoding to produce an encoded version of subsequent portions of the first transparency information channel belonging to the same Group of Pictures.

It is an advantage of this embodiment that the division of streams into pictures and groups of pictures is respected, which facilitates the decoding at the receiver end.

In an embodiment, the method according to the present invention further comprises counting respective numbers of portions of the first transparency information channel for which the first encoding and the second encoding are selected, and selecting an encoding of subsequent portions of the first transparency information channel in function of the numbers.

It is an advantage of this embodiment that statistical information about the nature of the transparency information is used to reduce the number of tentative encodings and assessments that must be conducted.

In an embodiment of the method according to the present invention, the first encoding comprises a Scalable Vector Graphics, SVG, encoding.

It is an advantage of this embodiment that the resulting encoded information can easily be transformed at the receiver end (zoomed-in, cropped, rotated, etc.) without suffering any loss of quality.

In an embodiment of the method according to the present invention, the third encoding comprises one of an HEVC encoding, an H.264 SVC encoding, and an H.264 MVC encoding.

It is an advantage of this embodiment that the invention can easily be integrated with existing standard compliant video encoding systems.

In a particular embodiment the third encoding comprises an H.264 MVC encoding, and wherein a number of additional transparency information channels corresponding to viewpoints are encoded by means of differential encoding with respect to the first transparency information channel.

It is an advantage of this embodiment that it renders the encoding of the various transparency information channels pertaining to different viewpoints more efficiently.

According to an aspect of the present invention, there is provided a computer program comprising software means configured to perform, when executed, a method described above.

According to an aspect of the present invention, there is provided an apparatus for encoding a video stream having a first transparency information channel in view of a predetermined target bit rate for the first transparency information channel, the apparatus comprising: a first encoder configured to encode portions of the first transparency information channel according to a lossless vector graphics encoding scheme; a second encoder configured to encode portions of the first transparency information channel according to a mathematical representation encoding scheme; a third encoder configured to encode portions of the first transparency information channel according to an MPEG-based encoding scheme; and an encoder switch, arranged to submit first portions of the transparency information channel to a selected one of the first encoder, the second encoder, and the third encoder, in order of descending preference, wherein a less preferred encoder is selected if encoding within a predefined target bit rate is not achieved with a more preferred encoder.

In an embodiment of the apparatus according to the present invention, the encoder switch is further arranged to submit subsequent portions of the first transparency information channel belonging to the same Group of Pictures, to the one of the first encoder, the second encoder, and the third encoder, selected for the first portions.

In an embodiment, the apparatus according to the present invention further comprises a statistics module configured to count respective numbers of portions of the first transparency information channel for which the first encoder and the second encoder are selected; and the encoder switch is further arranged to submit subsequent portions of the first transparency information channel to a statistically preferred one of the first encoder, the second encoder, and the third encoder, in function of the numbers.

In an embodiment of the apparatus according to the present invention, the first encoder comprises a Scalable Vector Graphics, SVG, encoder.

In an embodiment of the apparatus according to the present invention, the third encoder comprises one of an HEVC encoder, an H.264 SVC encoder, and an H.264 MVC encoder.

In a particular embodiment, the third encoder comprises an H.264 MVC encoder, the third encoder being configured to encode a number of additional transparency information channels corresponding to viewpoints by means of differential encoding with respect to the first transparency information channel.

According to an aspect of the present invention, there is provided an apparatus for decoding a video stream having a first transparency information channel, the apparatus comprising: a first decoder for decoding portions of the first transparency information channel encoded according to a lossless vector graphics encoding scheme; a second decoder for decoding portions of the first transparency information channel encoded according to a mathematical representation encoding scheme; a third decoder for decoding portions of the first transparency information channel encoded according to an MPEG-based encoding scheme; and a detector arranged to detect the encoding applied to received portions of the first transparency information channel, and to submit the received portions to one of the first decoder, the second decoder, and the third decoder, in accordance with the decoding.

In an embodiment of the apparatus according to the present invention, the lossless vector graphics encoding scheme comprises a Scalable Vector Graphics, SVG, encoding; and wherein the MPEG-based encoding scheme comprises one of an HEVC encoding, an H.264 SVC encoding, and an H.264 MVC encoding.

The effects and advantages of the computer program and the apparatus according to embodiments of the present invention correspond, mutatis mutandis, to the effects and advantages of the method according to corresponding embodiments of the present invention.

BRIEF DESCRIPTION OF THE FIGURES

Some embodiments of apparatus and/or methods in accordance with embodiments of the present invention are now described, by way of example only, and with reference to the accompanying drawings, in which.

DESCRIPTION OF EMBODIMENTS

Figure 1:
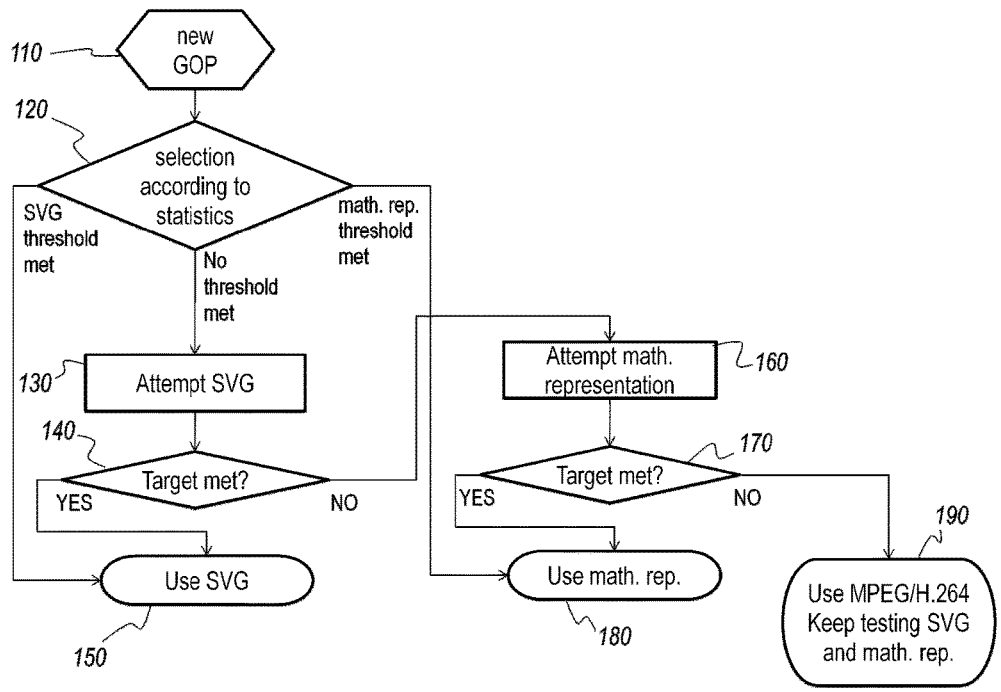
FIG. 1 provides a flowchart of a method according to an embodiment of the present invention.

Embodiments of the present invention are based on the insight of the inventors that it is advantageous to use the alpha channel, where available, to more efficiently encode the moving picture information (RGB, YUV, HSV, other).

Further embodiments of the present invention are based on the insight of the inventors that it is advantageous to use the alpha channel to more efficiently encode the depth information.

The current focus in the HEVC standardization is on the encoding of the image, optionally including the depth information. The impact of the alpha channel on the image and/or depth is being overlooked. Neglecting the alpha channel in the encoding phase of the image and depth of single- or multiview captured scene will result in inefficient coding, which in turn will increase storage and bandwidth requirements, and impact latency.

It is suggested in H.264 to code the alpha channel by using an auxiliary coded picture per access unit (a set of NAL units that correspond to exactly one decoded picture). These individual auxiliary pictures can be transmitted as raw information or coded as the luminance of the YUV components such as in MPEG4-Part 2.

However, the inventors have found that alpha channel information representing transparency or depth is usually very different from the grey scale component of color images. Typically, the content is much more predictable and delimited by very accurate edges or shapes that are cannot be coded efficiently by MPEG techniques.

Embodiments of the present invention present an extension of a typical MPEG encoder to provide hybrid encoding of the alpha channel in order to improve the compression of the alpha component for transparency/opacity signals. The main idea is to select the best coding scheme for the alpha channel(s) input(s), which includes optionally representing transparency or depth with non-MPEG compliant codecs, while the YUV channels are encoded using a MPEG-compliant encoding.

Preferably, the coding scheme for coding the transparency/opacity signal is chosen from: lossless vector graphics encoding such as Scalable Vector Graphics (SVG); lossless simple mathematical/analytical representation such as gradients, piece-wise constant or linear functions; and lossless or lossy depth encoding. The use of scalable graphics or mathematical representation encoding enables a lossless coding as well as lossless geometric transformations of the alpha channel if the video has to be decoded and resized or cropped. Ultimately, lossy HEVC encoding of the alpha component as a Y-component may be selected in case the preceding methods cannot encode the alpha content with a significant compression performance measured by an "objective rate".

The "objective rate" used for assessing the performance of the candidate coding schemes is made dependent on the QP or rate chosen for the YUV signals compressed by the encoder. Typically the user might want to restrict the alpha channel rate to a given percentage of the total rate for the YUV channels and alpha channel.

Figure 2:
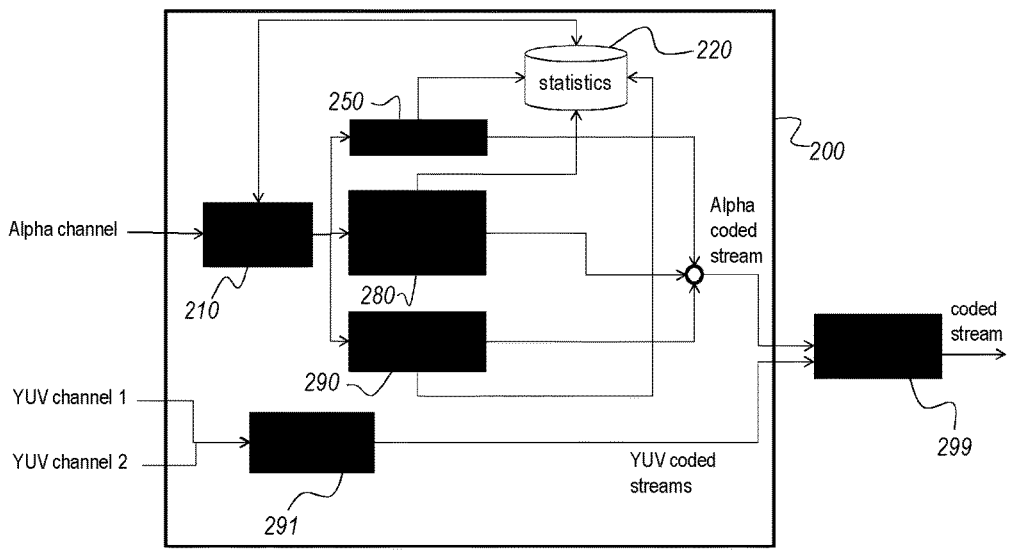
FIG. 2 presents a schematic illustration of an encoding apparatus according to an embodiment of the present invention.

In the embodiment illustrated in FIG. 2, the encoder 200 is composed of an MPEG-based encoder 291 (typically, a standard H.264 encoder) that compresses YUV components, as well as a specific alternative encoding branch 250, 280, 290 for the alpha channel. The alpha channel is separately coded using hybrid encoding. To achieve this, an additional block is introduced in de codec, which is referred to as an "encoder switch" 210, which performs a decision and selection of the type of the applicable alpha codec based on available hardware and rate statistics, and optionally former decisions:

Available hardware is taken into account to ensure that only coding schemes for which the required processing resources are available, may be selected—this check may take into account the fact that the calculations for some encoding schemes can easily be parallelized (e.g., SVG).

Rate statistics (symbolically represented as storage 220 in FIG. 2) are taken into account as indicated above, to ensure that the selected coding meets predetermined performance requirements as measured and/or averaged over a certain time range.

Former decisions are optionally taken into account to implement a form of "hysteresis", such that the alpha channel is coded in a consistent way for successive portions of the video stream, despite temporary and/or limited transgressions of the performance thresholds.

Preferably, specifically for the alpha channel frames corresponding to the Intra or IDR frames (start of a Group-of-Pictures a.k.a. GOP) of the H.264 encoding of the YUV components, two alternative encodings are first tested as follows. An exemplary decision tree that could be applied by the encoder switch 210 of the encoding apparatus 200 is illustrated in FIG. 1:

SVG picture encoding 130: the compression rate is measured and compared to the objective compression rate set for the YUV components;

If 140 SVG is not good enough (in terms of compression performance): a mathematical representation encoding 160, in which the alpha channel is segmented in piecewise linear functions;

If 170 the mathematical representation encoding is not good enough (in terms of compression performance): the alpha channel frame, and preferably all subsequent alpha frames of the entire GOP, are coded with an MPEG-based encoding 190.

SVG picture encoding 130 may provide the desired compression by relying on the presence of metadata about the way the alpha map was created. Preferably, in the absence of such metadata, the alpha map is segmented in differentiable regions, in which continuous edges are detected (for example by a Canny Edge Detector algorithm), connected edge shapes are detected, and regions separated by these shapes are then described by means of SVG descriptors.

Likewise, the mathematical representation 160 may be obtained on the basis of metadata. Preferably, in the absence of such metadata, the alpha map is segmented in differentiable regions, in which edges are detected (both hard edges, which are non-differentiable in at least one 2D direction, and free-form transitions, which may be described by polynomials, quadrics, planes, etc.), whereupon the image can be segmented according to this edge map into continuous and differentiable regions containing no edge and specific regions for soft edge transitions. For each region, a function $F(x,y,z)$ is fitted (e.g., a polynomial, quadric, or plane).

Thus, a mathematical representation may be obtained which consists of a composition of implicit functions. These functions denoted $F(x,y,z)$ are defined in the 3D space with $(x,y,z)$ coordinates where the pair $(x,y)$ is equal to the $(i,j)$ pixel coordinates of the alpha pixels and the z coordinate is the alpha value at $(i,j)$. The function F can be for example a sphere of radius r such as $F(x,y,z)=x^2+y^2+z^2-r^2=0$. Functions may be generalized polynomials in $(x,y,z)$ that are totally defined by their coefficients $a_{m,n,p}$ such that $F(x,y,z)$ is equal to $\Sigma_{m,n,p} a_{m,n,p} x^m y^n z^p$. The function can also be defined on a support domain described by a rectangular region in $(x,y)$ coordinates. Composition of functions is defined by multiple functions with their respective support domains, with an appropriate rule to resolve the composite function value in points in which the constituent function domains may overlap. Preferably, the specific rule is that if an $(x,y)$ pair receives two possible alpha values, only the highest alpha value will be associated with that $(x,y)$ pair. The advantage of the aforementioned preferred representation is that it allows an accurate representation of smooth transitions of alpha shapes or depth values. Furthermore, in case of scaling or re-sampling of the image, the alpha channel can be recomputed without any loss in quality.

Optionally, the encoding decisions are taken on the basis of individual slices/tiles in the alpha stream.

The MPEG-based encoder 290 and encoding 190 may be an H.264 encoder, for instance an HEVC encoder or an H.264 SVC encoder.

If compression performance statistics 220 are available from previous encoded GOPs, then the comparison test for compression performance may be based on the average between the median (or average) of the measured compression rate of previous frames and the compression rate of the current frame.

If the SVG 150; 250 or mathematical function 180; 280 encoding have been selected for the first frame of the GOP (or for a particular slice/tile of said first frame), the same encoder is used until the end of the GOP. If H.264 190; 290 encoding has been selected for the first frame of the GOP, the encoding is done using H.264, but the SVG and mathematical representation encodings may still be tested in order to keep compression rate statistics.

Preferably, the system checks whether the SVG 150; 250 or mathematical function 190; 290 encoding has been selected for a predefined minimum number of GOPS, and decides to apply the said encoding to the entire video if the predefined minimum is reached 120.

The MPEG-based encoder 290 and encoding 190 may be an H.264 MVC encoder, in which case multiple alpha channels are available for two or more viewpoints. In such a case, the compression rates performance tests may be based on the SVG or mathematical representation encoding of all available alpha channels considered as separate channels. The MVC encoding of alpha channels follows the same inter-frame hierarchy as the one selected for the YUV channels.

When the invention is applied to multiview streams, it is advantageous to only encode the small differences concerning the displacement of the edges in the alpha channel for different views, instead of the full alpha frame.

Preferably, the decision of the hybrid encoder for the alpha frames as well for parts (slices/tiles) of the alpha frame is signaled in the encoded stream.

Preferably, some or all of the encoding mechanisms described above for the alpha channel are also applied to the encoding of the depth information.

Optionally, the alpha coded stream and the YUV coded streams are combined in a container by an aggregator 299.

Figure 3:
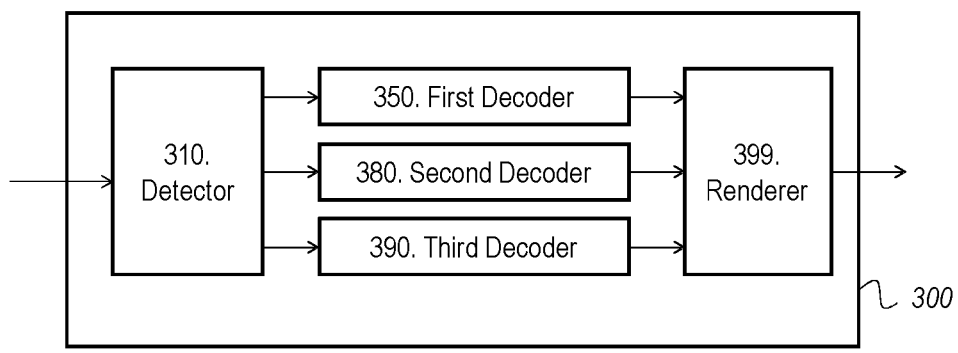
FIG. 3 presents a schematic illustration of a decoding apparatus according to an embodiment of the present invention.

As illustrated in FIG. 3, an associated decoding apparatus 300 in accordance with the present invention, which may for example be provided in a set-top box, a home gateway, a client computer program, or integrated into visualization hardware such as a TV set, comprises a first decoder 350 for decoding portions of the transparency information channel encoded according to a lossless vector graphics encoding scheme (e.g., SVG), a second decoder 380 for decoding portions of the transparency information channel encoded according to a mathematical representation encoding scheme, a third decoder 390 for decoding portions of the transparency information channel encoded according to an MPEG-based encoding scheme, and a detector 310 arranged to detect the encoding applied to specific portions of the transparency information channel, and to submit these portions to the appropriate decoder. The decoded transparency information is provided to the renderer 399.

For clarity reasons, the input and output interfaces of the apparatus 200, 300 according to embodiments of the present invention have not been described in detail.

The skilled person will immediately appreciate that the encoder 200 will obtain the information to be encoded from a network or a storage medium. The encoder thus comprises the necessary interfaces to obtain said information from such network or storage medium. The encoder 200 also comprises the necessary interfaces to deliver the encoded stream to a storage medium or a network. The hardware and software constituting such interfaces are known to the person skilled in the art. Preferably, interfaces are implemented and operated in order to comply with applicable standards, and in a particularly preferred way the encoder 200 is adapted to deliver its streams via the Internet; in this case, the encoder is equipped to operate in accordance with the TCP/IP protocol suite, preferably over an IEEE 802.3 or similar network interface.

The same considerations apply, mutatis mutandis, to the decoder 300. Preferably, interfaces are implemented and operated in order to comply with applicable standards, and in a particularly preferred way the decoder is adapted to obtain its streams via the Internet; in this case, the encoder is equipped to operate in accordance with the TCP/IP protocol suite, preferably over an interface such as IEEE 802.3 "Ethernet", IEEE 802.11 "Wireless LAN", IEEE 802.16 "Wireless MAN", 3G mobile, or a combination thereof.

Although methods and apparatus have been described hereinabove as separate embodiments, this is done for clarity purposes only, and it should be noted that features described only in connection with method embodiments may be applied in the apparatus according to the present invention to obtain the same technical effects and advantages, and vice versa.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for encoding a video stream having a first transparency information channel in view of a predetermined target bit rate for said first transparency information channel, said transparency information channel specifying a respective transparency value for pixel coordinates, said method comprising:
   tentatively applying a first encoding to a portion of said first transparency information channel, said first encoding comprising a lossless vector graphics encoding scheme;
   if said first encoding results in an encoded bitrate within said predetermined target bitrate, selecting said first encoding to produce an encoded version of said portion of said first transparency information channel; otherwise, tentatively applying a second encoding to said portion of said first transparency information channel, said second encoding comprising a mathematical representation encoding scheme, said mathematical representation being obtained by segmenting said transparency information in differentiable regions onto which is fitted a polynomial, quadric, or plane function of said pixel coordinates and alpha values;
   if said second encoding results in an encoded bitrate within said predetermined target bitrate, selecting said second encoding to produce an encoded version of said portion of said first transparency information channel; otherwise, selecting a third encoding to produce an encoded version of said portion of said first transparency information channel, said third encoding comprising an MPEG-based encoding scheme.

2. The method according to claim 1, further comprising using said selected encoding to produce an encoded version of subsequent portions of said first transparency information channel belonging to the same Group of Pictures.

3. The method according to claim 1, wherein said first encoding comprises a Scalable Vector Graphics, SVG, encoding.

4. The method according to claim 1, wherein said third encoding comprises an H.264 MVC encoding, and wherein a number of additional transparency information channels corresponding to viewpoints are encoded by means of differential encoding with respect to said first transparency information channel.

5. A non-transitory computer-usable data carrier storing instructions that, when executed by a computer, cause the computer to perform the method of claim 1.

6. An apparatus for encoding a video stream having a first transparency information channel in view of a predetermined target bit rate for said first transparency information channel, said transparency information channel specifying a respective transparency value for pixel coordinates, said apparatus comprising:
   a first encoder configured to encode portions of said first transparency information channel according to a lossless vector graphics encoding scheme;
   a second encoder configured to encode portions of said first transparency information channel according to a mathematical representation encoding scheme, said mathematical representation being obtained by segmenting said transparency information in differentiable regions onto which is fitted a polynomial, quadric, or plane function of said pixel coordinates and alpha values;

a third encoder configured to encode portions of said first transparency information channel according to an MPEG-based encoding scheme; and
an encoder switch, arranged to submit first portions of said transparency information channel to a selected one of said first encoder, said second encoder, and said third encoder, in order of descending preference, wherein a less preferred encoder is selected if encoding within a predefined target bitrate is not achieved with a more preferred encoder.

7. The apparatus according to claim 6, wherein said encoder switch is further arranged to submit subsequent portions of said first transparency information channel belonging to the same Group of Pictures, to said one of said first encoder, said second encoder, and said third encoder, selected for said first portions.

8. The apparatus according to claim 6, wherein said first encoder comprises a Scalable Vector Graphics, SVG, encoder.

9. The apparatus according to claim 6, wherein said third encoder comprises an H.264 MVC encoder, said third encoder being configured to encode a number of additional transparency information channels corresponding to viewpoints by means of differential encoding with respect to said first transparency information channel.

10. An apparatus for decoding a video stream having a first transparency information channel, said transparency information channel specifying a respective transparency value for pixel coordinates, said transparency information channel specifying a respective transparency value for pixel coordinates, said transparency information channel specifying a respective transparency value for pixel coordinates, said apparatus comprising:
a first decoder configured to decode portions of said first transparency information channel encoded according to a lossless vector graphics encoding scheme;
a second decoder configured to decode portions of said first transparency information channel encoded according to a mathematical representation encoding scheme, said mathematical representation being obtained by segmenting said transparency information in differentiable regions onto which is fitted a polynomial, quadric, or plane function of said pixel coordinates and alpha values;
a third decoder configured to decode portions of said first transparency information channel encoded according to an MPEG-based encoding scheme; and
a detector arranged to detect the encoding applied to received portions of said first transparency information channel, and to submit said received portions to one of said first decoder, said second decoder, and said third decoder, in accordance with said decoding.

11. The apparatus according to claim 10, wherein said lossless vector graphics encoding scheme comprises a Scalable Vector Graphics, SVG, encoding; and wherein said MPEG-based encoding scheme comprises one of an HEVC encoding, an H.264 SVC encoding, and an H.264 MVC encoding.

* * * * *